US006480837B1

(12) United States Patent
Dutta (10) Patent No.: US 6,480,837 B1
(45) Date of Patent: Nov. 12, 2002

(54) METHOD, SYSTEM, AND PROGRAM FOR ORDERING SEARCH RESULTS USING A POPULARITY WEIGHTING

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/464,850

(22) Filed: Dec. 16, 1999

(51) Int. Cl.[7] .............................................. G06F 17/30
(52) U.S. Cl. ................................ 707/3; 707/4
(58) Field of Search ................ 707/1, 2, 3, 4, 707/5, 7, 10, 513; 705/1, 14, 26; 709/202, 217, 226, 232

(56) References Cited

U.S. PATENT DOCUMENTS

| | | | | |
|---|---|---|---|---|
| 4,839,853 A | * | 6/1989 | Deerwester et al. | 364/900 |
| 5,765,150 A | | 6/1998 | Burrows | |
| 5,835,712 A | | 11/1998 | DuFresne | |
| 5,835,718 A | | 11/1998 | Blewett | |
| 5,862,325 A | | 1/1999 | Reed et al. | |
| 5,870,546 A | | 2/1999 | Kirsch | |
| 6,065,001 A | * | 5/2000 | Ohkubo et al. | 707/3 |
| 6,240,408 B1 | * | 5/2001 | Kaufman | 707/3 |
| 6,327,590 B1 | * | 12/2001 | Chidlovskii et al. | 707/5 |

OTHER PUBLICATIONS

HotBot Integrates Popularity Into Top Results; The Search Engine Report; [online]; Mar. 3, 1999 [retrieved on Dec. 8, 1998]. Retrieved from the Internet:<URL: http://www.searchenginewatch.com/sereport/9903–hotbot.html>.

Direct Hit Technology; A White Paper; [online]; before 12/99; [retrieved on Dec. 8, 1999]; Retrieved from the Internet: <URL: http://www.directhit.com/about/products/technology_whitepaper.html>.

Courtois, Martin P. & Berry, Michael W.; "Results Ranking in Web Search Engines"; online, DR–LINK, May 1, 1999, vol. 23, Issue 3.

* cited by examiner

Primary Examiner—Diane D. Mizrahi
Assistant Examiner—Apu M Mofiz (57) ABSTRACT

Disclosed is a method, system, program, and data structures for ordering electronic files subject to searching. At least one keyword is associated with each file. A physical location of each file is identified by a file address, such as a URL. A popularity weight is associated with at least one file address and key word pair such that a file address is capable of having multiple associated keywords and one associated popularity weight for each file address and keyword pair. In response to executing a search query including search keywords, file address search results are received that have at least one associated keyword that matches at least one search keyword in response to executing the search query. The search results are ordered according to the popularity weight associated with each file address search result and keyword pair whose keyword matches the search keyword. A document is then coded to include the file address search results such that the document will display the file address search results according to the ordering.

27 Claims, 4 Drawing Sheets

Fig. 1

| URL | Keyword | Popularity Weight |
|---|---|---|
| www.ibm.com | international | 2 |
| '''' | computer | 23 |
| '''' | software | 54 |
| www.uspto.gov | patents | 54 |
| '''' | trademarks | 43 |
| '''' | general | 1 |

METHOD, SYSTEM, AND PROGRAM FOR ORDERING SEARCH RESULTS USING A POPULARITY WEIGHTING

BACKGROUND OF THE INVENTION

1. Field of the Invention

The present invention relates to a method, system, and program for searching for file addresses, e.g., URLs, and ordering the search results using a popularity weighting indicating the frequency of selection of the URL from returned search results.

2. Description of the Related Art

To locate documents on the Internet, users typically use an Internet search engine. The user would enter one or more key words and perhaps indicate boolean operators for the search, and transmit the search request to a server including a search engine. Search engines include a spider program or crawler that periodically visits web pages and searches the Internet to locate new web pages and revise previously located sites to look for changes. The spider then places information from the pages it locates into a database index which relates URLs to search terms.

Search engines can index various information from the located pages to associate with the located URL. Many search engines index the full body of visible text, but may exclude commonly used words, e.g., "the", "and", etc. Search engines may also index keywords included in a special keyword meta tag in the document that holds key words the page designer designates to use for searching purposes. Search engines may include alternative text associated with images and perform word stemming to include variations of a word, e.g., politics, politician, political, etc. as keywords to include in the index. The keywords indexed for a particular URL are then searched when a user enters the keywords for a search. The results of a search include all URLs having indexed words that match the search term and any specified boolean search operators.

A search engine may locate numerous search results in response to a user search query, many of which may not be relevant. One problem search engine developers must address is the order in which to present the search results. Most search engines use the location and frequency of keywords on a web page as the basis of ranking search results. Other search engines may boost a pages display order if search keywords are included in the meta description and keywords tag of the page. A search engine can also provide a relevancy boost based on the number of pages and/or number of important web pages that include hypertext links to the search result page.

The response to a query is often determined by how keywords are indexed for a URL. In author-controlled search engines, the search engine providers allow the document author to designate the indexed keywords by specifying such words in the document. Other search engine providers use a editor-controlled approach, where the search engine provider employs editors to manually catalog web sites and the indexed keywords that will be used in searching. Author oriented search engines provide document authors the opportunity to include misleading words in the meta tags to cause the search engine to return the document in response to searches unrelated to the document content. Editor-controlled search engines can result in irrelevant search results if the editors associate the wrong keywords with the URL or exclude highly relevant key words from the URL/key word association.

To improve how results are presented, one search engine company, Direct Hit, has developed algorithms to rank search results according to the popularity of the site. The Direct Hit search engine anonymously monitors which web sites Internet searchers select from the search results list, how much time the searchers spend at these sites and other metrics. The sites that are selected by searchers are boosted in their ranking, while the sites that are consistently ignored by searchers are penalized in their rankings.

There is a need in the art for an improved method, system, program, and data structures for incorporating popularity of URL selection into the order in which search results are returned and displayed to the searcher.

SUMMARY OF THE PREFERRED EMBODIMENTS

To overcome the limitations in the prior art described above, preferred embodiments disclose a method, system, program, and data structures for ordering electronic files subject to searching. At least one keyword is associated with each file. A physical location of each file is identified by a file address. A popularity weight is associated with at least one file address and key word pair such that a file address is capable of having multiple associated keywords and one associated popularity weight for each file address and keyword pair. In response to executing a search query including search keywords, file address search results are received that have at least one associated keyword that matches at least one search keyword in response to executing the search query. The search results are ordered according to the popularity weight associated with each file address search result and keyword pair whose keyword matches the search keyword. A document is then coded to include the file address search results such that the document will display the file address search results according to the ordering.

In further embodiments, a request is received to access at least one of the file address search results displayed in the document. The popularity weights are adjusted upward for the at least one requested file address search result and keyword pair matching the search keywords. Still further, the popularity weights may be adjusted downward for those file address and keyword pairs matching the search keywords that were not requested.

In Internet embodiments, a server having a server URL executes the search and generates the document. In such case, the file address search results comprise search result URLs denoting the location of files distributed at servers over an Internet. The document is generated by combining the server URL with each search result URL into a combined URL for each search result. The document is then coded to display each search result with the combined URL such that issuing a request to the combined URL is directed to the server. A request to the combined URL is received and the popularity weight associated with each search result URL in the combined URL and keyword pair matching the search keywords is adjusted upward. The request is directed to the search result URL.

Preferred embodiments provide a method, system, program, and data structures for associating popularity weights indicating the frequency of selection, i.e., popularity, of a particular URL from returned search results. In preferred embodiments, a popularity weight may be associated with each URL and keyword pair to provide keyword specific popularity weightings. The popularity weights are used to determine the order in which search results are presented and displayed to the searcher. One advantage of keyword specific popularity weighting is that the ordering of the presentation of a particular URL in a returned search is based on the popularity associated with the search keyword, not the URL in general. In fact, a URL may have widely different popularity weightings for different keywords, indicating the relevance of the URL to the different search keywords. In this way, preferred embodiments provide a fine grained ordering based on a measured popularity that is specific to the search keywords and incorporates a user ranking of the importance of the URL to specific keywords.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
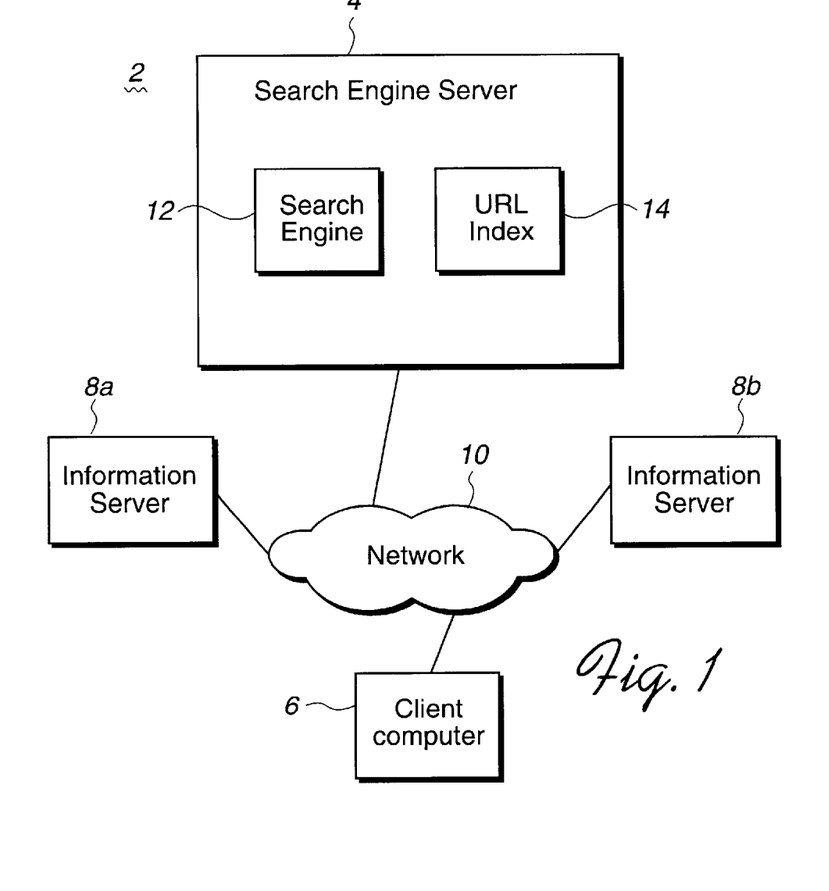
FIG. 1 illustrates a computing environment in which preferred embodiments in accordance with the present invention are implemented.

FIG. 1 illustrates a computing environment in which preferred embodiments are implemented. The computing environment 2 includes a search engine server 4, at least one client computer 6, and information servers 8a, b that communicate over a network 10. The network 10 may be a TCP/IP network, such as the Internet and World Wide Web, or any other network system known in the art, e.g., LAN, Ethernet, WAN, System Area Network (SAN), Token Ring, etc. Alternatively, there may be separate and different networks between the servers 4, 8a, b and the client 6.

All the systems 4, 6, and 8a, b communicate using a document transfer protocol such as the Hypertext Transfer Protocol (HTTP), or any other document transfer protocol known in the art, such FTP, Gopher, WAIS, etc. The client 6 includes a browser program, such as an HTML browser, capable of submitting requests using the HTTP protocol in a manner known in the art. If the client 6 requests the URL for the search engine server 4, then the search engine server 4 would return an HTML page in which the user at the client 6 may enter keywords for an Internet 10 search.

The search engine server 4 includes a search engine program 12 that performs search engine operations known in the art such as searching for web pages and indexing the URLs of the web pages with keywords in a URL index 14. When the client 6 submits a search request to the search engine server 4, the search engine 12 will query the URL index 14 in a manner known in the art to locate URL entries that have keywords that match the search terms according to any search operators, such as boolean operators, etc.

Figure 2:
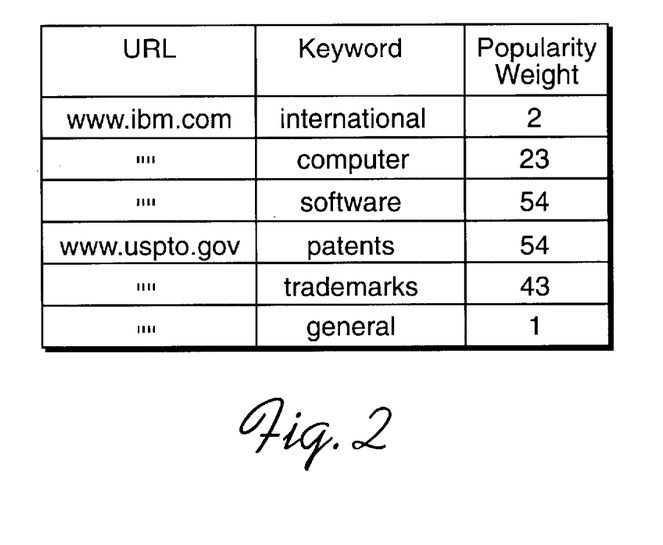
FIG. 2 illustrates an example of how URLs, keywords and popularity weights are associated in accordance with preferred embodiments of the present invention.

FIG. 2 illustrates an example of the URL index 14 providing an association of a URL, keyword, and popularity weight, thus providing a popularity weight for each URL/keyword pair. The popularity weight indicates the frequency of selection of the associated URL when returned in response to a search including the keyword associated with the URL and popularity weight.

The URL/keyword associations in the index 14 can be generated using prior art search engine indexing known in the art to associate URLs with keywords used for searching. In addition, the preferred embodiment search engine would include the capability to associate a popularity weight with each URL/keyword pair. Preferred embodiments may add the association of the popularity weight to current URL indexes used by search engines. Current search engines associate the URL with certain keywords, from the title, the entire content of the document, keyword metatags, etc. After the URL index is generated in a manner known in the art, the preferred embodiments would start associating a popularity weighting with each keyword for a particular URL, i.e., URL/keyword pair. Thus, any one URL can have numerous associated popularity weightings if many of the keywords associated with the URL have been the subject of search queries. For instance, in FIG. 2, the URLs "www.ibm.com" and "www.uspto.gov" include multiple popularity weights for each URL/keyword pair. Many search engines use all words on the page as keywords. Because the U.S. Patent Office site has the word "general info" on its main page, the keyword "general" could be associated with the Patent Office URL (www.uspto.gov) and have a low popularity weight as few people searching on the term "general" would likely be interested in the Patent Office web site.

The manner in which a popularity weight is associated with a URL/keyword pair may be implemented using database and indexing techniques known in the art. In preferred embodiments, an association of a popularity weight to a URL/keyword pair would not be made until the keyword is the target of a search query in which the URL for the keyword is returned in the search results. In this way, the weighting association may be added to current URL indexes. Alternatively, all URL/keyword pairs could be initialized with a popularity weight that is adjusted upward or downward depending on its selection from returned search results in the manner discussed below.

Whenever the search engine 12 obtains search results of URLs, the search engine 12 would generate an HTML page to display the search results ordered according to the popularity weights for each URL/keyword pair involved in the search. For instance, if the search was on the keyword "international" and the URL "www.ibm.com" was returned, then the popularity weight for "www.ibm.com" that would be used in determining the ordering would be "2", the weight for the "www.ibm.com"/"international" pair.

Upon generating an HTML page for search results, the search engine 12 would further generate a unique ID for the HTML page, including a field indicating the number of URLs that have been selected from the HTML page. The field in the URL indicating the number of URLs already selected from the page would be used to determine the adjustment to the popularity weighting, such that later requested URLs would have a relatively lower priority weight adjustment than earlier requested file address search results.

Figure 3A:
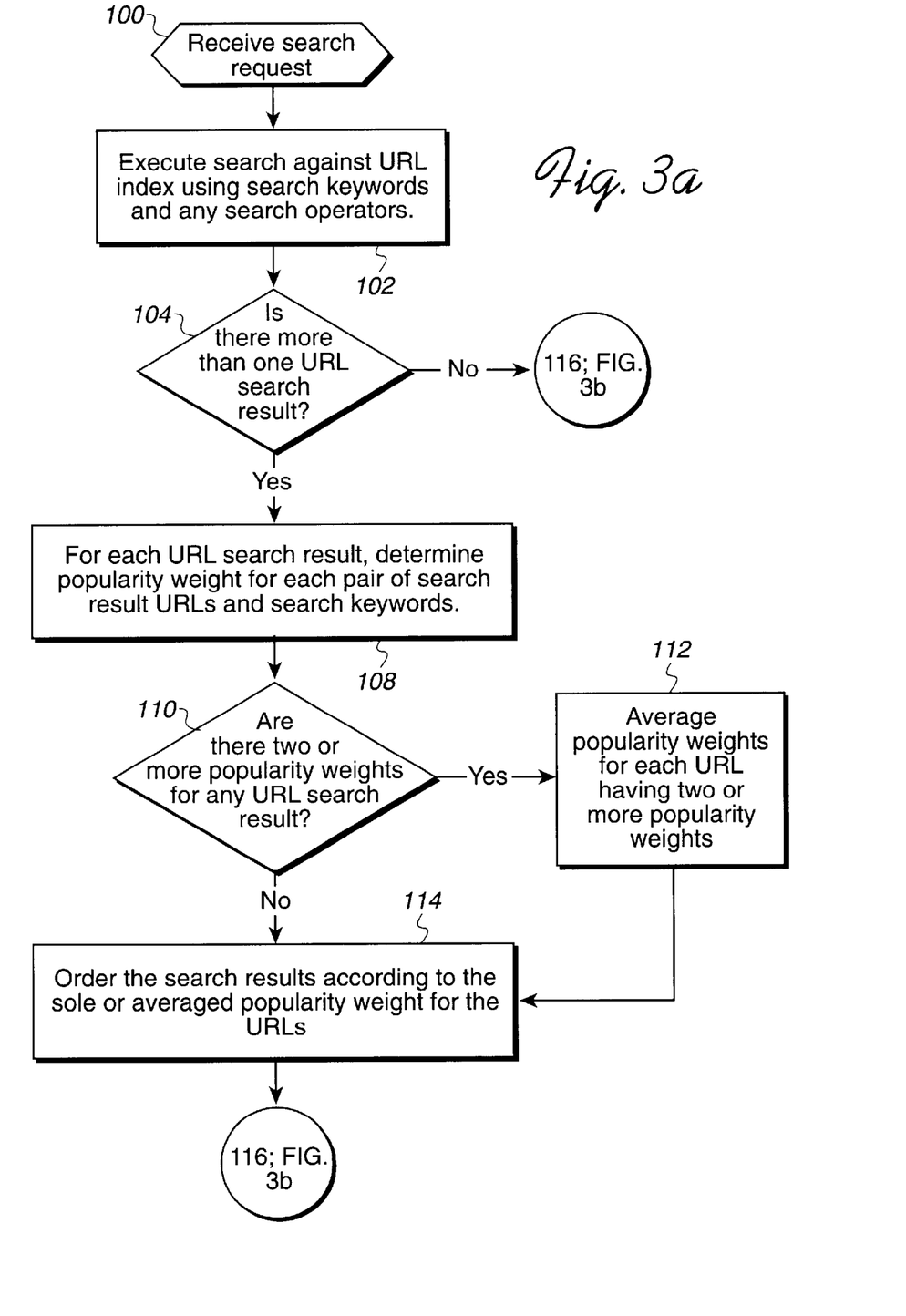
FIGS. 3a, b illustrate logic implemented in a search engine to return search results in accordance with preferred embodiments of the present invention.
Figure 3B:
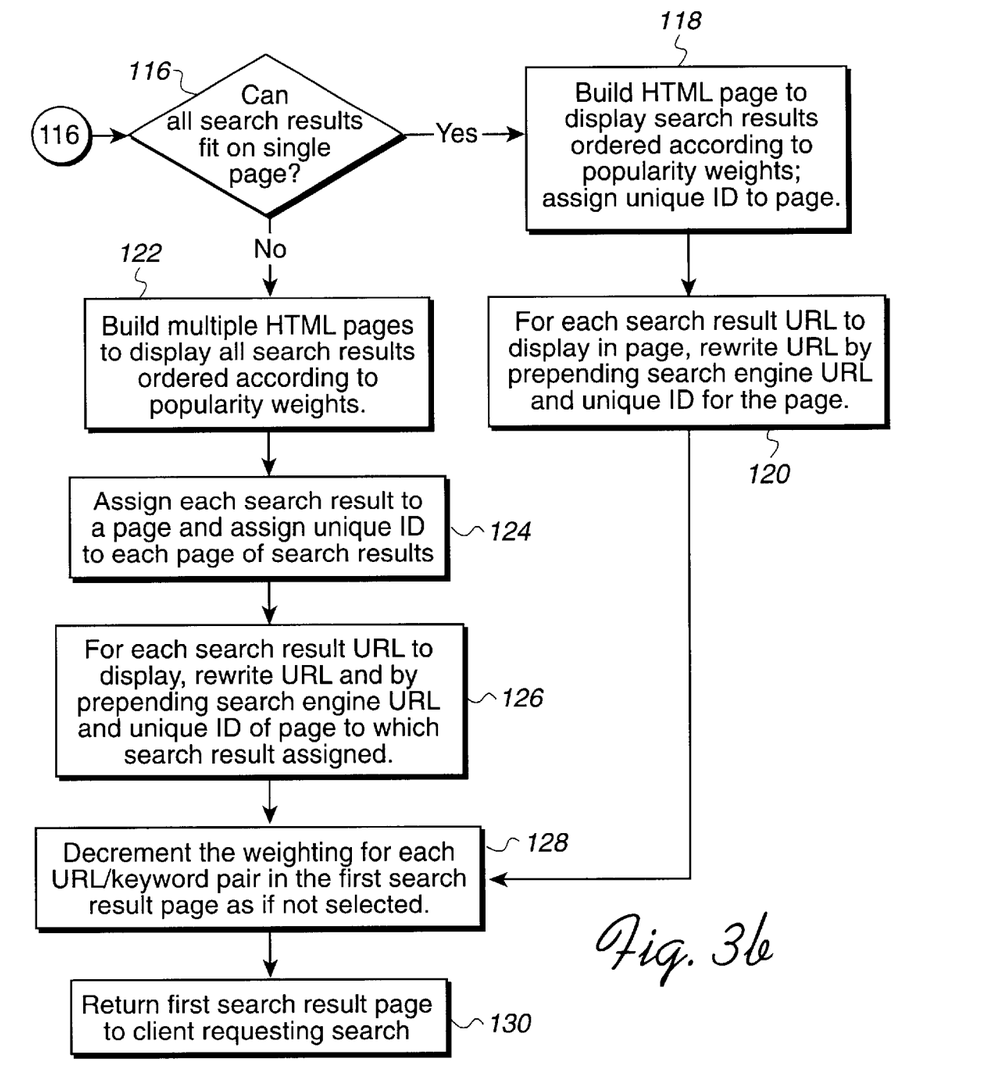

FIGS. 3a, b illustrate logic implemented in the search engine program 12 to maintain the popularity weights for each URL/keyword pair. The popularity weights could be initialized at some neutral number to allow for decrementing to indicate a low priority for a particular URL/keyword pair.

With respect to FIG. 3a, control begins at block 100 with the search engine 12 receiving a search request from the client 6. The search engine 12 executes (at block 102) the search against the URL index 14 using search keywords and any search operators included in the search. If there is more than one search result (at block 104), then for each URL search result, the search engine determines (at block 108) the popularity weight for each search result and keyword pair matching the search keyword from the URL index 14. Thus, any one URL search result can have multiple relevant popularity weights if the URL index 14 has two or more entries for the search result URL that match the search keywords. For instance, with reference to FIG. 2, a search of "computer" and "software", would return the IBM URL, and there are two relevant popularity weightings as the search keywords match two of the IBM URL keywords.

If there are two or more popularity weights for any search result URL (at block 110), then the search engine 12 averages (at block 112) the popularity weights for each such URL. In this way, only one popularity weight or averaged popularity weight is associated with each URL search result. The search results are then ordered (at block 114) according to the determined sole or averaged popularity weight for the URL. Other methods may be used in the event that there are two popularity weights associated with one URL search result, such as selecting the maximum popularity weight for the search result URL.

From block 114, control proceeds to block 116 in FIG. 3b to build HTML page(s) to include the search results to return to the requesting client 6. If all search results can fit on a single HTML page (at block 116), then the search engine 12 builds (at block 118) a single HTML page to display all the search results ordered according to the popularity weights and assigns a unique identifier (ID) to that page. As discussed, this unique ID would include a field indicating the number of URLs already selected from the page, which is initially zero. The search engine 12 then rewrites (at block 120) the URL for each search result by prepending the URL of the search engine and the unique ID of the page. If all the search results cannot fit onto a single HTML page, then the search engine 12 builds (at block 122) multiple HTML pages to display all the search results ordered according to popularity weights between pages and within pages. The search results are assigned (at block 124) to a page and each page is assigned a unique ID, which includes the field indicating the number of URLs already selected from the particular page. The search engine 12 then rewrites (at block 126) each search result URL by prepending the URL of the search engine and the unique ID to which the search result is assigned.

After building the page(s), from block 120 or 126, control proceeds to block 128 where the search engine 12 decrements the popularity weighting for each URL/search key word pair in the first page as if the URL/keyword pair was not selected. The search page is then returned (at block 130) to the requesting client. Only after selection is the popularity weight for the selected URL/keyword pair adjusted upward. The popularity weights for URL/search keyword pairs on pages not yet sent to the searcher client 6 will be decremented when the page including the URL search results is returned to the client 6. Thus, initially, the popularity weights for all URL search results from the page returned to the user are adjusted as if they were never selected by the user at the client 6. Only those URLs selected will have the URL/search keyword pair popularity weights adjusted upward.

Figure 4:
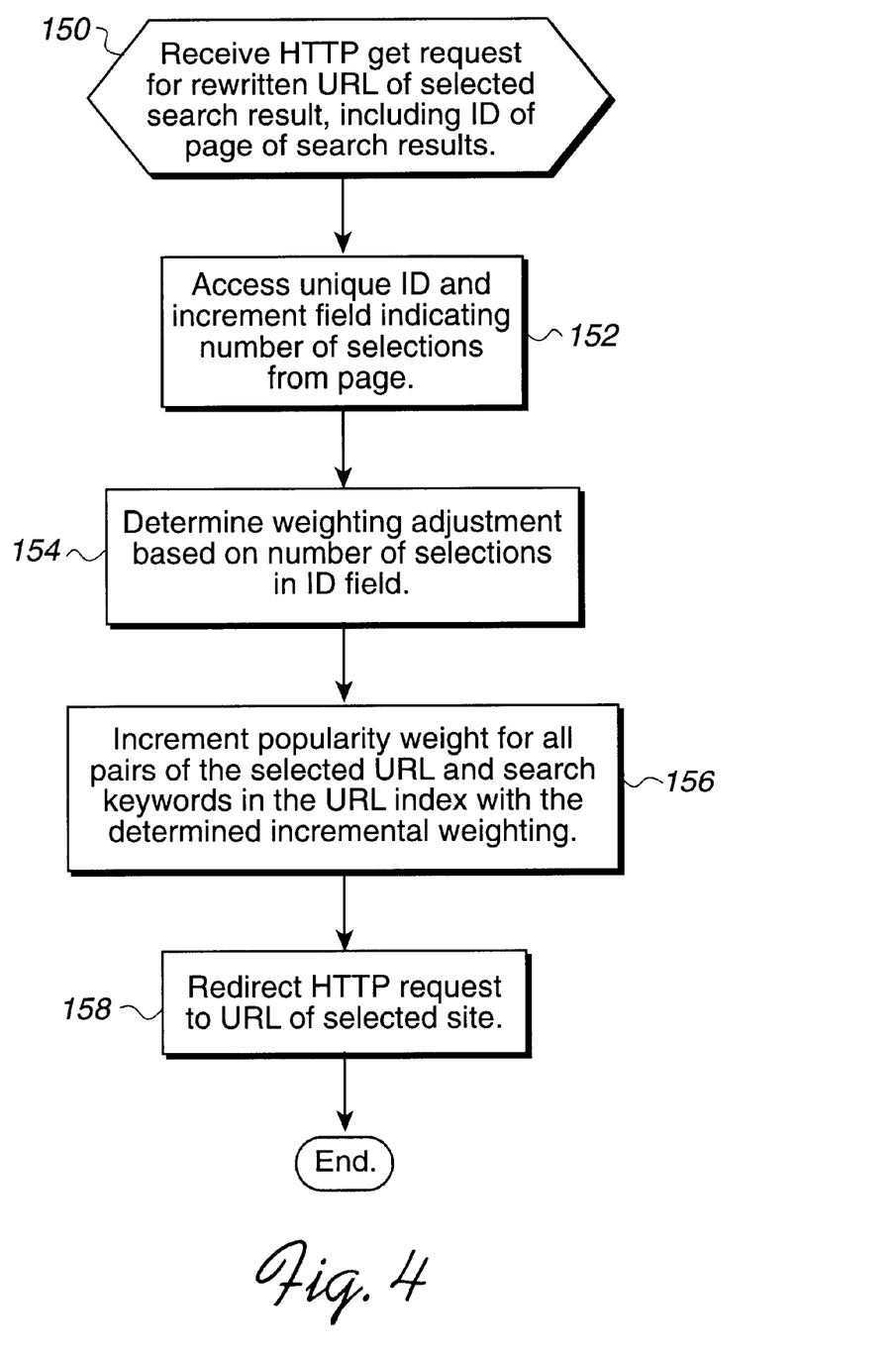
FIG. 4 illustrate logic implemented in the search engine to adjust popularity weights and process requests for the search result URLs in accordance with preferred embodiments of the present invention.

FIG. 4 illustrates logic implemented in the search engine 12 to process a user selection of a URL search result displayed on the page of search results. Because the URL of the search engine server 4 is prepended to the search result URL, the user's selection of the rewritten search result URL displayed on the returned HTML page will be directed to the search engine server 4, not the URL of the actual search result site the user selected. However, the user is made aware of the redirection because the user can view the search engine URL in the search result URL displayed in the HTML page. Below is an example URL (1) rewritten prepending the search engine URL "www.searchengine.com" to the search result URL "www.news.com":

"www.searchengine.com/www.news.com" (1)

As can be seen, the user of the search engine would clearly view that the URL has been rewritten and that the result URL they are selecting will involve linking to the search engine site. To further ensure that user privacy is protected and that the user is made aware of the redirection, a notice can be displayed in the HTML page alerting the user to the fact that selection of the URL will first go to the search engine server 4 before the selected site, and that information will be anonymously gathered on user selections.

With respect to FIG. 4, control begins at block 150 with the search engine server 4 receiving an HTTP get request for the rewritten URL of the selected search result, including the unique ID of the page from which the user selected the URL. The search engine 12 then accesses (at block 152) the unique ID and increments the field of the ID indicating the number of search results already selected from the page. The search engine 12 would then determine (at block 154) a weighting adjustment to add to the popularity index that is based on the current number of selections in the ID field. This incremental adjustment would also have to account for the fact that the weighting was initially decremented (at block 128) as a default adjustment. The search engine would then adjust (at block 156) the popularity weight for each URL search result and keyword pair matching the search keywords with the weighting adjustment determined at block 154. The search engine 12 would then redirect (at block 158) the HTTP request to the URL of the selected site where the user may access the site directly.

The preferred embodiment method, system, program, and data structures provides a technique for tracking the popularity of search results for the purpose of determining how to present or order search results in future searches. Moreover, preferred embodiments provide fine grained popularity weightings by associating a popularity weighting with each keyword of a URL. Only those popularity weightings having keywords matching the search keywords are adjusted. Thus, the popularity weightings are keyword specific. This is advantageous because the popularity of a URL may vary for different search keywords. For instance, with respect to FIG. 2, those searching on the words "general" and "Patton" would likely want web sites on the famous United States general George S. Patton. A search using the word "general" may return the U.S. Patent and Trademark Office URL ("www.uspto.gov") because of the keyword "general" in the URL index 14. However, people searching on the term "general" would likely not be interested in the U.S. Patent Office URL. Thus, the popularity weighting associated with the Patent Office URL and the keyword "general" may be quite low. However, the popularity weighting associated with the U.S. Patent Office URL and the keyword "patent" would likely be high as many people searching on patents would be interested in the U.S. Patent Office web page.

Thus, the preferred embodiments take into account that different keyword/URL pairs may have significantly different popularity weightings. Providing this level of detail in the popularity weightings increases the likelihood that the ordering of search results will more accurately reflect the true popularity of the URL to the specific search than popularity weightings that do not provide keyword specific popularity weightings.

The preferred embodiments also take into account the popularity within a particular page for search results that may span multiple pages. As discussed, the number of selections for each page is maintained on a page-by-page basis. Thus, the first URL selection on each page of search results will have its popularity weight(s) for the search keyword(s) adjusted upward as if it was the first selected URL. Thus, the fact that the search engine 12 locates a URL on a later page does not adversely impact the popularity weight of the URL. This aspect of the preferred embodiments takes into consideration the fact that users may not consider all pages of the search result or, after finding one page of interest, abandon consideration of additional pages of search results. For this reason, those search results on later pages that the user has not been able to review are not "penalized" for being assigned to a later page. Only the popularity weights for URL search results on pages returned to the user that were capable of being reviewed are adjusted.

Alternative Embodiments and Conclusions

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, etc. Further, the article of manufacture may comprise the implementation of the preferred embodiments in a transmission media, such as a network transmission line, wireless transmission media, signals propagating through space, radio waves, infrared signals, etc. Of course, those skilled in the art will recognize many modifications may be made to this configuration without departing from the scope of the present invention.

Preferred embodiments provided a particular arrangement of the URL index to provide for the association of a popularity weight with each URL/keyword pair. However, those skilled in the database art will realize alternative was for implementing the association of popularity weights with URL/keyword pairs.

In preferred embodiments, popularity weights were provided for every keyword/URL pair. However, in alternative embodiments, the popularity weights may only be provided for certain keywords, such as those in a title or keyword metatag, etc.

In preferred embodiments, the order in which a URL search result is selected is determined by using the unique ID for a page with a field indicating the number of selections that have occurred on that page. In alternative embodiments, alternative codes or data structures may be utilized to determine how to adjust the priority of the URL/keyword popularity weights for a particular page of search results.

Preferred embodiments were described with respect to the HTTP protocol for transmitting documents between computers within a network. However, those skilled in the art will appreciate that the preferred embodiments may apply to any communication protocol for allowing a client to request and access files in a network environment.

Preferred embodiments were described with respect to presenting search results in HTML pages. However, alternative file formats for building web-like pages may be used, such as Dynamic Hypertext Mark-Up Language (DHTML), the Extensible Markup Language (XML), Cascading Sytle Sheets, any other Standard Generalized Markup Language (SGML), or any other language known in the art for creating interchangeable, structured documents. Further, any version of HTML may be used, including version 2.0, 3.2, 4.0, etc. In yet further embodiments, the requested file may be in any other file format, i.e., other than an SGML type format, capable of being displayed or otherwise executed by the requesting client.

Preferred embodiments were described with respect to a network environment in which pages are provided to a client from a server over a network, such as the Internet. However, in alternative embodiments, the search engine server may be maintained within and used by a single computing device, such as a computer with a hard disk drive, to search files on the computer hard disk drive.

In preferred embodiments, the files being searched are identified by a URL address and may be located on different servers connected over a common network such as the Internet. In alternative embodiments, any file addressing scheme may be used, including a file pathname indicating the location of a file in local storage. In such case, the preferred embodiments may be used to search for files located in local storage that are not dispersed throughout a network.

In summary, the present invention provides a method, system, program, and data structures for ordering electronic files subject to searching. At least one keyword is associated with each file. A physical location of each file is identified by a file address. A popularity weight is associated with at least one file address and key word pair such that a file address is capable of having multiple associated keywords and one associated popularity weight for each file address and keyword pair. In response to executing a search query including search keywords, file address search results are received that have at least one associated keyword that matches at least one search keyword in response to executing the search query. The search results are ordered according to the popularity weight associated with each file address search result and keyword pair whose keyword matches the search keyword. A document is then coded to include the file address search results such that the document will display the file address search results according to the ordering.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for ordering electronic files subject to searching, comprising:

associating at least one keyword with each file, wherein a physical location of each file is identified by a file address;

associating a popularity weight with at least one file address and key word pair, wherein a file address is capable of having multiple associated keywords and one associated popularity weight for each file address and keyword pair, wherein the popularity weight for each file address and keyword pair indicates a frequency of selection of the file address in response to searches including the associated keyword, and wherein the popularity weights associated with multiple keywords associated with one file address are capable of being different;

executing a search query including search keywords;

receiving file address search results that have at least one associated keyword that matches at least one search keyword in response to executing the search query, and ordering the search results according to the popularity weight associated with each file address search result and keyword pad whose keyword matches the search keyword.

2. The method of claim 1, further comprising coding a document to include the file address search results, wherein the document will display the file address search results according to the ordering.

3. The method of claim 1, wherein a server having a server URL executes the search and generates the document, wherein the file address search results comprise search result URLs denoting the location of files distributed at servers over an Internet, wherein generating the document including the file address search results comprises:

combining the server URL with each search result URL into a combined URL for each search result;

coding the document to display each search result with the combined URL, wherein issuing a request to the combined URL is directed to the server;

receiving a request to the combined URL;

adjusting upward each popularity weight associated with each search result URL in the combined URL and keyword pair matching the search keywords; and redirecting the request to the search result URL.

4. The method of claim 1, further comprising;

receiving a request to access at least one of the file address search results displayed in the document; and adjusting the popularity weights upward for the at least one requested file address search result and keyword pair matching the search keywords.

5. The method of claim 4, further comprising adjusting the popularity weights downward for those file address and keyword pairs matching the search keywords that were not requested.

6. The method of claim 4, wherein the adjustment to the popularity weight is determined by a number of previously requested file address search results from the document, wherein later requested file address search results have a relatively lower priority weight adjustment than earlier requested file address search results.

7. The method of claim 1, further comprising generating multiple documents to include all the file address search results when the search results cannot all be included in a single document, wherein each document displays the file address search results according to the ordering.

8. The method of claim 7, wherein the adjustment to the popularity weight is determined by a number of previously requested file address search results within one document, wherein later requested file address search results have a relatively lower priority weight adjustment than earlier requested file address search results within one document.

9. A method for ordering electronic files subject to searching, comprising:

associating at least one keyword with each file, wherein a physical location of each file is identified by a file address;

associating a popularity weight with at least one file address and key word pair, wherein a file address is capable of having multiple associated keywords and one associated popularity weight for each file address and keyword pair;

executing a search query including search keywords;

receiving file address search results that have at least one associated keyword that matches at least one search keyword in response to executing the search query; and ordering the search results according to the popularity weight associated with each file address search result and keyword pair whose keyword matches the search keyword; and determining multiple popularity weights associated with at least one file address search result for those search results having multiple associated keywords that match the search keyword; and averaging the determined multiple popularity weights to determine an averaged popularity weight for the file address search results having determined multiple popularity weights, wherein the search results are ordered according to the popularity weight associated with each file address search result having only one associated keyword that matches the search keywords and the averaged popularity weight for each file address search result having only multiple associated keywords that matches the search keywords.

10. A system for ordering electronic files subject to searching, comprising:

means for associating at least one keyword with each file, wherein a physical location of each file is identified by a file address;

means for associating a popularity weight with at least one file address and key word pair, wherein a file address is capable of having multiple associated keywords and one associated popularity weight for each file address and keyword pair, wherein the popularity weight for each file address and keyword pair indicates a frequency of selection of the file address in response to searches including the associated keyword, and wherein the popularity weights associated with multiple keywords associated with one file address are capable of being different;

means for executing a search query including search keywords;

means for receiving file address search results that have at least one associated keyword that matches at least one search keyword in response to executing the search query, and means for ordering the search results according to the popularity weight associated with each file address search result and keyword pair whose keyword matches the search keyword.

11. The system of claim 10, further comprising means for coding a document to include the file address search results, wherein the document will display the file address search results according to the ordering.

12. The system of claim 11, wherein a server having a server URL executes the search and generates the document, wherein the file address search results comprise search result URLs denoting the location of files distributed at servers over an Internet, wherein the means for generating the document including the file address search results comprises:

means for combining the server URL with each search result URL into a combined URL for each search result;

means for coding the document to display each search result with the combined URL, wherein issuing a request to the combined URL is directed to the server;

means for receiving a request to the combined URL;

means for adjusting upward each popularity weight associated with each search result URL in the combined URL and keyword pair matching the search keywords; and means for redirecting the request to the search result URL.

13. The system of claim 11, further comprising;

means for receiving a request to access at least one of the file address search results displayed in the document; and means for adjusting the popularity weights upward for the at least one requested file address search result and keyword pair matching the search keywords.

14. The system of claim 13, further comprising means for adjusting the popularity weights downward for those file address and keyword pairs matching the search keywords that were not requested.

15. The system of claim 13, wherein the adjustment to the popularity weight is determined by a number of previously requested file address search results from the document, wherein later requested file address search results have a relatively lower priority weight adjustment than earlier requested file address search results.

16. The system of claim 11, further comprising means for generating multiple documents to include all the file address search results when the search results cannot all be included in a single document, wherein each document displays the file address search results according to the ordering.

17. The system of claim 16, wherein the adjustment to the popularity weight is determined by a number of previously requested file address search results within one document, wherein later requested file address search results have a relatively lower priority weight adjustment than earlier requested file address search results within one document.

18. A system for ordering electronic files subject to searching, comprising:

means for associating at least one keyword with each file, wherein a physical location of each file is identified by a file address;

means for associating a popularity weight with at least one file address and key word pair, wherein a file address is capable of having multiple associated keywords and one associated popularity weight for each file address and keyword pair;

means for executing a search query including search keywords;

means for receiving file address search results that have at least one associated keyword that matches at least one search keyword in response to executing the search query; and means for ordering the search results according to the popularity weight associated with each file address search result and keyword pair whose keyword matches the search keyword;

means for determining multiple popularity weights associated with at least one file address search result for those search results having multiple associated keywords that match the search keyword; and means for averaging the determined multiple popularity weights to determine an averaged popularity weight for the file address search results having determined multiple popularity weights, wherein the search results are ordered according to the popularity weight associated with each file address search result having only one associated keyword that matches the search keywords and the averaged popularity weight for each file address search result having only multiple associated keywords that matches the search keywords.

19. An article of manufacture for ordering electronic files subject to searching, the article of manufacture comprising computer useable media accessible to a computer, wherein the computer usable media includes at least one computer program that is capable of causing the computer to perform:

associating at least one keyword with each file, wherein a physical location of each file is identified by a file address;

associating a popularity weight with at least one file address and key word pair, wherein a file address is capable of having multiple associated keywords and one associated popularity weight for each file address and keyword pair, wherein the popularity weight for each file address and keyword pair indicates a frequency of selection of the file address in response to searches including the associated keyword, and wherein the popularity weights associated wit. multiple keywords associated with one file address are capable of being different;

executing a search query including search keywords;

receiving file address search results that have at least one associated keyword that matches at least one search keyword in response to executing the search query; and ordering the search results according to the popularity weight associated with each file address search result and keyword pair whose keyword matches the search keyword.

20. The article of manufacture of claim 19, further comprising coding a document to include the file address search results, wherein the document will display the file address search results according to the ordering.

21. The article of manufacture of claim 19, wherein a server having a server URL executes the search and generates the document, wherein the file address search results comprise search result URLs denoting the location of files distributed at servers over an Internet, wherein generating the document including the file address search results comprises:

combining the server URL with each search result URL into a combined URL for each search result;

coding the document to display each search result with the combined URL, wherein issuing a request to the combined URL is directed to the server;

receiving a request to the combined URL;

adjusting upward each popularity weight associated with each search result URL in the combined URL and keyword pair matching the search keywords; and redirecting the request to the search result URL.

22. The article of manufacture of claim 19, further comprising;

receiving a request to access at least one of the file address search results displayed in the document; and adjusting the popularity weights upward for the at least one requested file address search result and keyword pair matching the search keywords.

23. The article of manufacture of claim 22, further comprising adjusting the popularity weights downward for those file address and keyword pairs matching the search keywords that were not requested.

24. The article of manufacture of claim 22, wherein the adjustment to the popularity weight is determined by a number of previously requested file address search results from the document, wherein later requested file address search results have a relatively lower priority weight adjustment than earlier requested file address search results.

25. The article of manufacture of claim 19, further comprising generating multiple documents to include all the file address search results when the search results cannot all be included in a single document, wherein each document displays the file address search results according to the ordering.

26. The article of manufacture of claim 25, wherein the adjustment to the popularity weight is determined by a number of previously requested file address search results within one document, wherein later requested file address search results have a relatively lower priority weight adjustment than earlier requested file address search results within one document.

27. An article of manufacture for ordering electronic files subject to searching, the article of manufacture comprising computer useable media accessible to a computer, wherein the computer usable media includes at least one computer program that is capable of causing the computer to perform:

associating at least one keyword with each file, wherein a physical location of each file is identified by a file address;

associating a popularity weight with at least one file address and key word pair, wherein a file address is capable of having multiple associated keywords and one associated popularity weight for each file address and keyword pair;

executing a search query including search keywords;

receiving file address search results that have at least one associated keyword that matches at least one search keyword in response to executing the search query;

ordering the search results according to the popularity weight associated with each file address search result and keyword pair whose keyword matches the search keyword;

determining multiple popularity weights associated with at least one file address search result for those search results having multiple associated keywords that match the search keyword; and averaging the determined multiple popularity weights to determine an averaged popularity weight for the file address search results having determined multiple popularity weights, wherein the search results are ordered according to the popularity weight associated with each file address search result having only one associated keyword that matches the search keywords and the averaged popularity weight for each file address search result having only multiple associated keywords that matches the search keywords.

* * * * *

UNITED STATES PATENT AND TRADEMARK OFFICE
CERTIFICATE OF CORRECTION

PATENT NO.    : 6,480,837 B1
DATED         : November 12, 2002
INVENTOR(S)   : Rabindranath Dutta It is certified that error appears in the above-identified patent and that said Letters Patent is hereby corrected as shown below:

<u>Column 12,</u>
Line 33, delete "wit" and insert -- with --.

Signed and Sealed this

Fourteenth Day of October, 2003

JAMES E. ROGAN
*Director of the United States Patent and Trademark Office*